United States Patent [19]

Inaba et al.

[11] 4,366,423
[45] Dec. 28, 1982

[54] INDUSTRIAL ROBOT SYSTEM

[75] Inventors: Hajimu Inaba, Hino; Shinsuke Sakakibara, Kunitachi, both of Japan

[73] Assignee: Fujitsu Fanuc Limited, Tokyo, Japan

[21] Appl. No.: 268,806

[22] Filed: Jun. 1, 1981

Related U.S. Application Data

[63] Continuation of Ser. No. 5,774, Jan. 23, 1979, abandoned.

[30] Foreign Application Priority Data

Jan. 31, 1978 [JP] Japan ................................ 53-8956

[51] Int. Cl.³ .............................................. G05B 9/02
[52] U.S. Cl. .................................. 318/563; 318/532; 318/565; 318/570; 318/632
[58] Field of Search ............... 318/563, 565, 632, 567, 318/568, 569, 570

[56] References Cited

U.S. PATENT DOCUMENTS

| | | | |
|---|---|---|---|
| 3,265,946 | 8/1966 | Johnson et al. ...................... | 318/563 |
| 3,802,622 | 4/1974 | Nishimura et al. ................... | 318/563 |
| 4,045,660 | 8/1977 | Weisgerber et al. ................. | 318/632 |
| 4,086,517 | 4/1978 | Yamaki et al. ....................... | 318/563 |
| 4,150,326 | 4/1979 | Engelberger et al. ............... | 318/563 |

FOREIGN PATENT DOCUMENTS

| | | | |
|---|---|---|---|
| 2014281 | 10/1971 | Fed. Rep. of Germany ...... | 318/563 |
| 1396644 | 6/1975 | United Kingdom ................ | 318/563 |

OTHER PUBLICATIONS

Operation Manual of Unimate, Kawasaki Heavy Industries, Ltd., 11/1/73.

Primary Examiner—David Smith, Jr.
Assistant Examiner—Eugene S. Indyk
Attorney, Agent, or Firm—Armstrong, Nikaido, Marmelstein & Kubovcik

[57] ABSTRACT

In order to attain a more suitable control of a robot unit which serves a machine tool in accordance with various conditions of the operations of the machine tool and the robot unit, the number of the kinds of signals produced in the machine tool is increased and a predetermined control of the robot unit is attained in response to each of the increased kinds of signals.

2 Claims, 2 Drawing Figures

INDUSTRIAL ROBOT SYSTEM

This is a continuation, of application Ser. No. 5,774, filed Jan. 23, 1979 now abandoned.

BACKGROUND OF THE INVENTION

The present invention relates to an industrial robot system used in combination with a machine tool and the like.

The use of the industrial robot system in combination with a machine tool sometimes causes a dangerous state, such as a clash between the machine tool and the robot, and accordingly reduces the reliability of the industrial robot system, unless the robot is operated in accordance with the operating conditions of the machine tool. To prevent such dangers from occurring in the prior art industrial robot system, the action of the robot is controlled by such signals as WAIT signal, an INHIBIT signal and an EMERGENCY STOP signal which are produced in the machine tool.

However, these three kinds of signals, i.e., WAIT, INHIBIT and EMERGENCY STOP, are insufficient for dealing with all kinds of conditions for operating the machine tool, since there are so many kinds available. The most suitable manner for controlling a robot should be selected in accordance with various kinds of abnormal conditions of arising during the operation of the machine tool which is the function of the industrial robot system. With only these three kinds of signals, it is difficult to obtain the most suitable manner for controlling a robot.

The present invention was introduced because of the need to solve the above-described difficulty.

It should be noted that the above-mentioned prior art industrial robot system is disclosed, for example, in the Manual for Operation of the Industrial Robot System "UNIMATE", published by KAWASAKI HEAVY INDUSTRIES LTD.

SUMMARY OF THE INVENTION

It is an object of the present invention to increase the number of the kinds of signals produced in the machine tool so that the operations of the robot can be suitably applied to any abnormal operation of the machine tool, so as to increase the level of the reliability of the industrial robot system.

It is another object of the present invention to increase the number of the kinds of signals produced in the machine tool, particularly by including the HOLD signal, so that the operations of the robot can be more suitably applied to each abnormal operation of the machine tool and a re-start operation capable of being actuated by means of pushing a certain button can be provided, so as to increase the level of the reliability of the industrial robot system.

PREFERRED EMBODIMENT OF THE INVENTION

Figure 1:
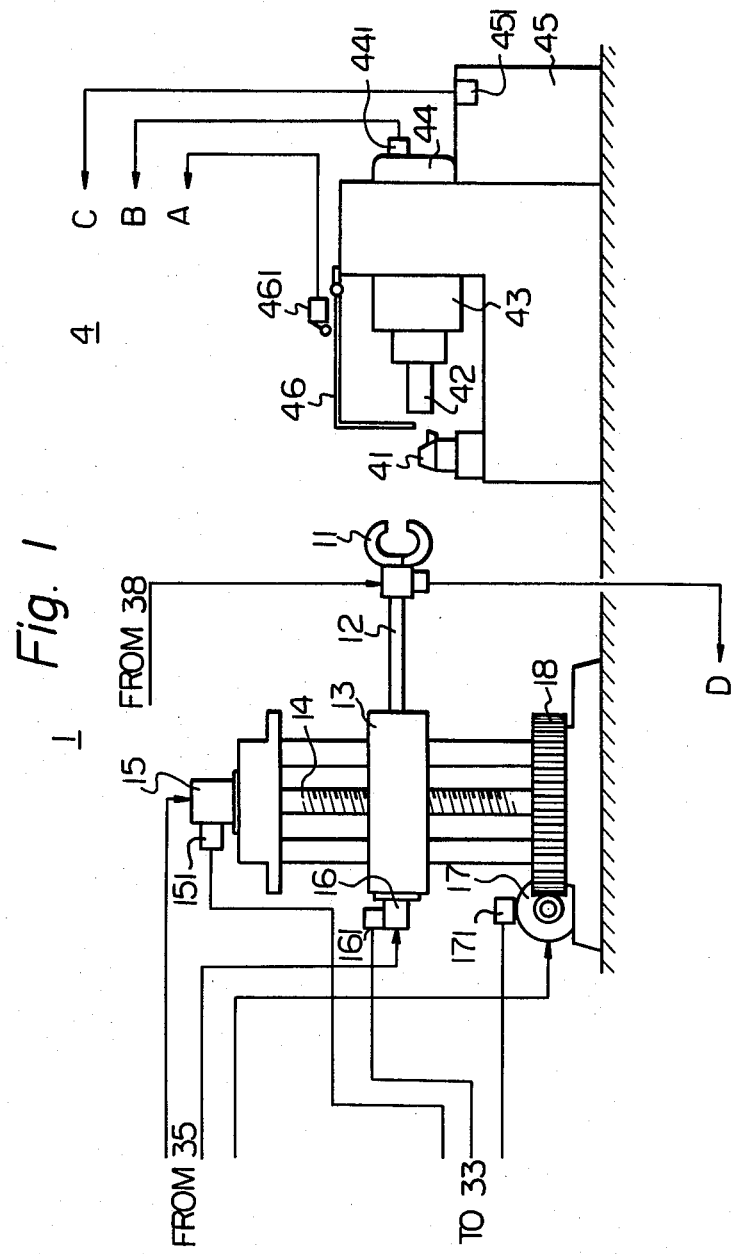
FIG. 1 is a schematic diagram of an industrial robot system combined with a machine tool as an embodiment of the present invention.

A robot unit 1 shown in FIG. 1 is of a type controlled by three axes, i.e., Z-axis for vertical movement, $\theta$-axis for rotational movement and R-axis for horizontal movement of an arm 12 and a hand 11 of the robot unit. The vertical movement is realized by means of the rotation of a gear shaft 14 rotated by a Z-axis motor 15. The rotation of the gear shaft is converted into a vertical movement of a casing 13 which is engaged with the gear shaft 14. The arm 12 having a hand 11 is coupled to the casing 13. The rotational movement is realized by means of the rotation of the gear wheel 18 rotated by the $\theta$-axis motor 17. The rotation of the gear wheel 18 causes the casing 13 to rotate and accordingly causes the arm 12 and the hand 11 to also rotate. The horizontal movement is realized by means of moving the arm 12 with respect to the casing 13 caused by the rotation of the R-axis motor 17. These three motors, i.e., Z-, $\theta$- and R-axis motors, are driven by input signals supplied from a servo amplifier 35 in a controlling unit 2. The grasping action and the rotating action are controlled by a signal supplied from an Auxiliary Functional Controller 38 in the controlling unit 2. Thus, the entire action of the robot unit 1 is controlled by the controlling unit 2. While under the control of the controlling unit 2, the robot unit 1 conducts some predetermined operations for a machine tool 4, such as mounting and dismounting of a work 42, exchanging of a tool 41 and the like.

The hand 11 of the robot unit 1 is provided with a hand sensor 111 which detects a break-down of the hand 11.

The machine tool 4 comprises the tool 41, the work 42, a main spindle 43, a main spindle motor 44, a power source 45, a door 46, a door sensor 461, a rotation sensor 441 and a power source sensor 451.

Figure 2:
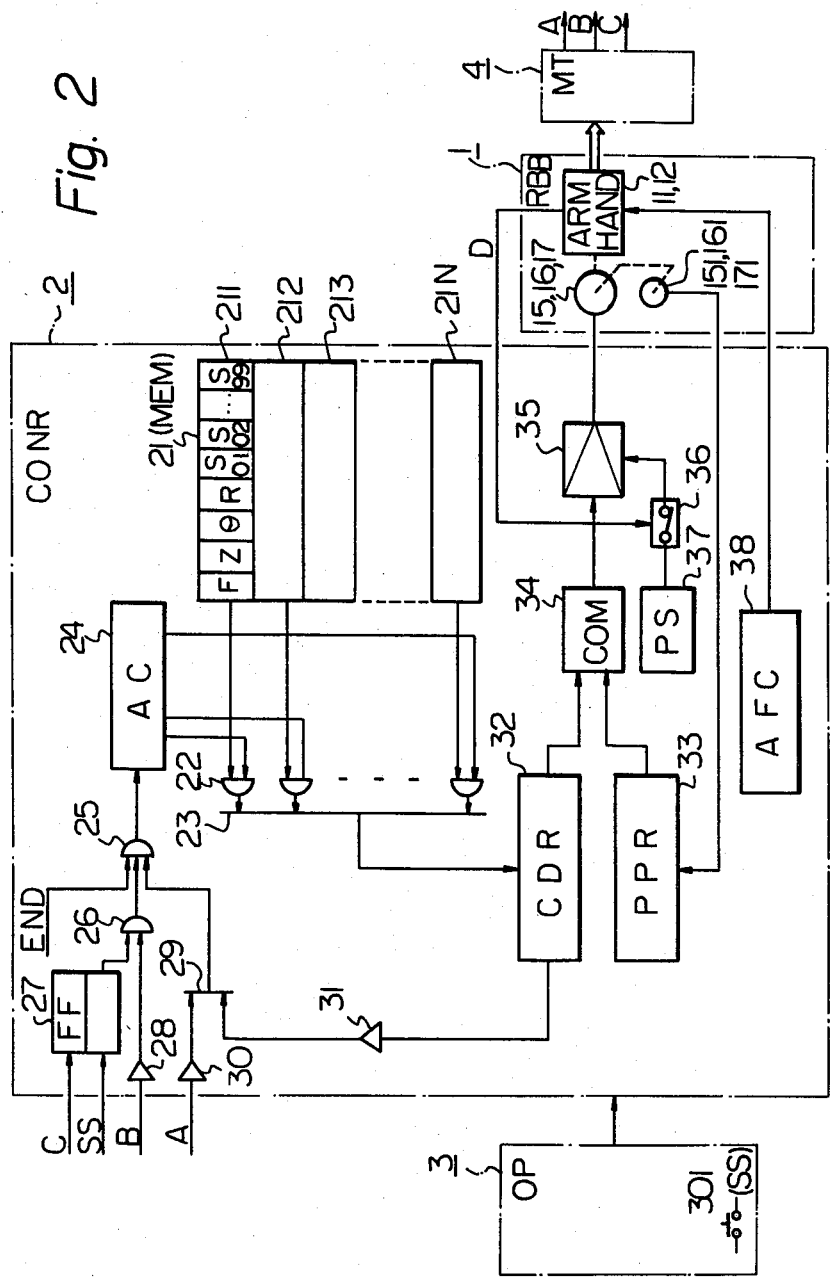
FIG. 2 is a block circuit diagram of the industrial robot system shown in FIG. 1.

As illustrated in FIG. 2, the machine tool 4 is served by the robot unit 1; the robot unit 1 is controlled by the controlling unit 2; and the unit 2 receives signals from the machine tool 4, the robot unit 1 and the operating panel 3. The machine tool 4 and the robot unit 1 produce the following four kinds of signals, i.e., WAIT Signal (A), INHIBIT Signal (B), HOLD Signal (C) and EMERGENCY STOP Signal (D).

I. WAIT Signal (A)

A WAIT Signal is, for example, a signal which is produced by the door sensor 461 when the door 46 is closed. In this example the WAIT Signal is produced only when the door 46 is closed and not when the door 46 is open. It is also possible to use as WAIT Signals signals such as those produced in accordance with the work-grasping condition of chucks or jigs.

II. INHIBIT Signal (B)

An INHIBIT Signal is, for example, a signal which is produced by the rotation sensor 441 when the main spindle motor 44 is being rotated. In this example, an INHIBIT Signal is produced only when the main spindle motor 44 is rotating and not when the main spindle motor 44 is stopped.

III. HOLD Signal (C)

A HOLD Signal is, for example, a signal which is produced by the power source sensor 451 when the power source 45 is in an OFF condition. In this example, a HOLD Signal is produced only when the power source 45 is in an OFF condition and not when the power source 45 is in an ON condition.

IV. EMERGENCY STOP Signal (D)

An EMERGENCY Signal is, for example, a signal which is produced by the hand sensor 111 when the hand is caused to be broken down. In this example, an Emergency Signal is produced only when the hand 11 is broken down and not when the hand 11 is in a normal condition.

In the controlling unit 2 illustrated in FIG. 2, there is provided a memory 21 which is divided into a number of memory blocks 211, 211, 213, . . . 21N, to each of which one number in a sequence of numbers is assigned as the address.

In the teaching mode, which is a step in the preparation for operating the industrial robot system, the teaching procedure is conducted via the operation panel 3 in order to store the instruction data into the memory 21. In the reproduction mode, which is a step in the actual operation of the robot unit 1, the above-mentioned stored instruction data is read out in sequence so that the robot unit 1 is operated in accordance with the read-out instruction data.

Each of the memory blocks of the memory 21 is further divided into a number of memory regions, each of which regions stores a kind of instruction data such as the feeding rate F, Z-axis instruction value Z, $\theta$-axis instruction value $\theta$, R-axis instruction value R and S-code instructions S-01, S-02, . . . S-99. For example, S-01 is assigned to CHECKING OF WAIT SIGNAL and S-02 through S-99 are assigned to auxiliary functional instructions.

The content of an address counter 24 is counted due to an input from an AND gate 25. An address of the memory blocks of the memory 21 is designated by the output of the address counter 24. The data stored in the designated memory block is read out and then transferred to a controlling data register 32 through an AND gate 22 and OR gate 23. When the operation of the robot corresponding to the read-out data of a memory block is completed, the END signal is supplied to the AND gate 25, and then the AND gate 25 supplies the address counter 24 with an input, thus causing one count-up of the address counter 24 which initiates the reading out of the next designated memory block for effecting the next operation of the robot.

The operation of the robot unit 1 is controlled sequentially in accordance with the instruction data of one memory block registered in the controlling data register 32.

The instruction value as an output of the controlling data register 32 is compared in a comparator 34 with the present position value as an output of a present value register 33. If a difference exists between these two values, the comparator 34 supplies an input to the servo amplifier 35 which drives the motors for the three axes 15, 16, 17 so as to operate the robot unit 1. The motions of the robot unit 1 are detected by detectors 151, 161, 171 in such a manner that such motions are respectively represented by pulse sequences which are sent to and stored in the present position register 33. One step in the operation of the robot unit 1 is completed when the contents of the controlling data register 32 and present position register 33 become equal.

The operations of the controlling unit 2 in response to the above-described four signals transmitted from the machine tool 4 and the robot unit 1 will now be explained.

I. For WAIT Signal (A)

The operation program is designed in such a manner that, at the time a CHECKING OF WAIT SIGNAL S-01 is being read out as an instruction data from a memory block, if a WAIT Signal is produced by the machine tool 4, the robot unit 1 will be kept waiting, and if the WAIT Signal is caused to disappear from the machine tool 4, the operation of the robot unit 1 will be started again. These procedures are conducted via the controlling data register 32, an inverter 31, an inverter 30, and an OR gate 29. If the CHECKING OF WAIT SIGNAL S-01 is supplied to the inverter 31 from the controlling data register 32 and the WAIT Signal (A) is supplied to the inverter 30, both inverters 30 and 31 will supply the signal "0" to the OR gate 29. Accordingly, the OR gate 29 will not produce an output which prevents the address counter 24 from being updated. After that, if the WAIT Signal (A) is caused to disappear, the signal supplied to the OR gate from the inverter 30 will be changed into "1", thus allowing the address counter 24 to be updated.

The above-described procedure makes it possible for the operation of the robot unit 1 to proceed after the OPEN state of the door 46 of the machine tool 4 is confirmed.

II. For INHIBIT Signal (B)

When the INHIBIT Signal B is produced at the machine tool 4, even if no CHECKING OF WAIT SIGNAL S-01 is being read out, the robot unit 1 is caused to be in a waiting state. After that, when the INHIBIT Signal B has disappeared, the operation of the robot unit 1 will be automatically started again without requiring any operation such as the pushing of a starting button. These procedures are conducted via an inverter 28 and an AND gate 26. When the INHIBIT Signal is produced, the signal supplied to the AND gate 26 from the inverter 28 is "0", and the address counter 24 is prevented from being updated. After that, when the INHIBIT Signal has disappeared, the signal supplied to the AND gate 26 from the inverter 28 is changed into "1", thus allowing the address counter 24 to be updated.

The above-described procedure makes it possible to prevent the hand 11 from grasping the work 42 while the spindle 43 is rotating and to cause the hand 11 to grasp the word 42 while the spindle 43 is not rotating.

III. For HOLD Signal (C)

When the HOLD Signal C is produced in the machine tool 4, the Signal is supplied to the first input of a flip-flop 27, than an output signal "0" of the flip-flop 27 is produced, and accordingly the output of the AND gate 25 is caused to be "0". Thus, the address counter 24 is prevented from being updated, and accordingly the operation of the robot unit 1 is stopped. In this case, the operation of the robot unit 1 cannot be started again even if the HOLD Signal has disappeared, because the flip-flop 27 continues to produce the output signal "0".

After that, if a starting button 301 in the operating panel 3 is pushed down, the starting signal SS is caused to be produced and supplied to the second input of the flip-flop 27, and accordingly the flip-flop 27 is reset to produce the output signal "1". Thus, the AND gate 26 is caused to produce the output signal "1" which in turn also causes the AND gate 25 to produce the output signal "1". Thus, the address counter 24 starts its updating again, and accordingly the operation of the robot unit 1 is restarted.

The above-described procedure makes it possible to stop the operation of the robot unit 1 in response to the shutting-down of the power source 45, so that after the power source 45 has recovered to the ON state, such recovery of the power source 45 itself cannot start the operation of the robot unit 1. However, the operation of the robot unit 1 can be started only after the starting operator who has completed the checking of the whole system.

IV. For EMERGENCY STOP Signal (D)

When the EMERGENCY STOP Signal D is produced in the robot unit 1, a switch 36 shuts off a power supply 37 directed to the servo amplifier 35, and accordingly the operation of the robot unit 1 is stopped. In this case, the operation of the robot unit 1 cannot be started again even f the EMERGENCY STOP Signal D has disappeared, since the switch 36 is not provided with any automatic closing means in response to the absence of the EMERGENCY STOP Signal D.

After that, the operation of the robot unit 1 can be started again only after the robot unit 1 has completely returned to its initial state and the checking of the whole system has been accomplished.

What is claimed is:

1. An industrial robot system for operating in conjunction with a machine tool, said robot system comprising a robot unit having an arm, a hand, a set of Z-, $\theta$, and R-axis motors, a set of Z-, $\theta$, and R-axis motion detectors, an operation panel means having a starting button, and a controlling means, said controlling means comprising a memory for storing instruction data including a feed rate, Z-, $\theta$, and R-axis instruction values and data of functional instructions, input circuits, an address counter coupled to the input circuits through an AND gate, a controlling data register receiving a signal from the memory and the address counter through an AND gate and an OR gate, a present value register coupled to the robot unit, a comparator for comparing signals from the controlling data register and the present value register, a servo amplifier coupled to the comparator and to a switch for connecting and disconnecting a power supply circuit to the servo amplifier, wherein said input circuits are adapted to receive a WAIT signal from the machine tool, an INHIBIT signal from the machine tool, an EMERGENCY STOP signal from the robot unit, a starting signal from the operation panel means, and signals from said Z-, $\theta$, and R-axis motion detectors in accordance with the operating conditions of the machine tool and wherein said controlling means is further adapted to receive a HOLD signal from the machine tool produced in a HOLD condition sensing device, said HOLD signal being supplied to the input circuits, the input circuits including a first input of a flip-flop circuit which produces an "0" output signal in response to the HOLD signal preventing the address counter from being updated, so that the operation of the robot is stopped and is prevented from starting again unless the starting button in the operation panel means is pushed.

2. An industrial robot system as set forth in claim 1, wherein said HOLD condition sensing device senses the operation of a power source for said machine tool.

* * * * *

UNITED STATES PATENT AND TRADEMARK OFFICE
CERTIFICATE OF CORRECTION

PATENT NO. : 4,366,423

DATED : December 28, 1982

INVENTOR(S) : HAJIMU INABA ET AL

It is certified that error appears in the above-identified patent and that said Letters Patent is hereby corrected as shown below:

Column 5, line 9, after "starting" insert --- button 301 in the operating panel 3 is pushed by an ---.

Column 5, line 19, change "f" to --- if ---.

Signed and Sealed this

Third Day of July 1984

[SEAL]

Attest:

GERALD J. MOSSINGHOFF

*Attesting Officer*    *Commissioner of Patents and Trademarks*